United States Patent
Maetaki

(10) Patent No.: US 8,526,124 B2
(45) Date of Patent: Sep. 3, 2013

(54) OPTICAL SYSTEM WITH LONG FOCAL LENGTH AND OPTICAL APPARATUS HAVING THE SAME

(75) Inventor: Satoshi Maetaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/272,331

(22) Filed: Oct. 13, 2011

(65) Prior Publication Data

US 2012/0092779 A1 Apr. 19, 2012

(30) Foreign Application Priority Data

Oct. 18, 2010 (JP) ................................. 2010-233470

(51) Int. Cl.
*G02B 3/02* (2006.01)
*G02B 13/18* (2006.01)
*G02B 15/14* (2006.01)
*G02B 13/02* (2006.01)

(52) U.S. Cl.
CPC ...................................... *G02B 13/18* (2013.01)
USPC ............................ 359/716; 359/690; 359/748

(58) Field of Classification Search
USPC .......... 359/386–692, 708, 715–717, 745–748
See application file for complete search history.

(56) References Cited

U.S. PATENT DOCUMENTS

2011/0310486 A1* 12/2011 Eguchi .......................... 359/570

FOREIGN PATENT DOCUMENTS

JP   11-109222 A   4/1999
JP   2009-271354 A   11/2009

* cited by examiner

*Primary Examiner* — Scott J Sugarman
*Assistant Examiner* — Robert E Tallman
(74) *Attorney, Agent, or Firm* — Rossi, Kimms & McDowell LLP

(57) ABSTRACT

An optical system, in order from an object side to an image side, includes a first lens unit having a positive refractive power, a second lens unit having a negative refractive power, and a third lens unit having a positive or negative refractive power. The first lens unit is configured by a first partial lens unit and a second partial lens unit each having a positive refractive power. The first partial lens unit is configured by a positive single lens, and has at least one aspherical surface. The second partial lens unit is configured by a positive lens and a negative lens, and has a diffraction optical surface of a diffraction optical element rotationally symmetric with reference to an optical axis direction. The second lens unit is a focus lens unit that is movable in the optical axis direction. And a paraxial lateral magnification βasph meets a predetermined condition.

8 Claims, 4 Drawing Sheets

OPTICAL SYSTEM WITH LONG FOCAL LENGTH AND OPTICAL APPARATUS HAVING THE SAME

BACKGROUND OF THE INVENTION

1. Field of the Invention

The present invention relates to an image pickup lens with a long focal length, which is suitably used for an image pickup optical system such as a silver-salt film camera, a digital still camera, or a video camera.

2. Description of the Related Art

Previously, an image pickup optical system (a telephoto lens) of so-called a telephoto type that is configured by a front lens unit having a positive refractive power and a rear lens unit having a negative refractive power in order from an object side to an image side has been known as an image pickup optical system having a long focal length.

Japanese Patent Laid-Open NO. H11-109222 discloses an optical system that is configured by using an inexpensive material with a low specific gravity and a diffraction optical element with a large effect of correcting a chromatic aberration without using a material having an abnormal partial dispersibility in order to reduce a weight and a cost of the optical system. Japanese Patent Laid-Open No. 2009-271354 discloses a small-size and light-weight inner focus type telephoto lens in which various kinds of aberrations such as a chromatic aberration have been appropriately corrected by arranging a diffraction optical element in an optical system and also by using an aspherical surface.

However, in Japanese Patent Laid-Open No. H11-109222, it is difficult to reduce the weight since the number of lenses constituting the front lens unit of the telephoto lens is the same as the conventional number. In Japanese Patent Laid-Open No. 2009-271354, a total length of the optical system can be shortened to reduce the weight of a lens barrel, but the sensitivity gets higher. Commonly, the sensitivity for a surface accuracy of the front lens unit arranged at the object side of the telephoto lens and a manufacturing error such as an assembly error is high. There is a tendency that the sensitivity gets higher as the refractive power of the front lens unit is strengthened to shorten the total length compared with the focal length, and that on the other hand the sensitivity gets lower as the refractive power of the front lens unit is weakened to lengthen the total length compared with the focal length.

Particularly, in the conventional art disclosed in Japanese Patent Laid-Open No. 2009-271354, an aspherical surface having a large amount of errors is used as a surface closest to the object side in order to appropriately correct aberrations other than the chromatic aberration, such as a spherical aberration and a field curvature, which are deteriorated by shortening the total length. Accordingly, it is difficult to manufacture the optical system which is disclosed in Japanese Patent Laid-Open No. 2009-271354. Furthermore, in order to reduce the deterioration of the aberration caused by shortening the total length, many lenses are disposed in the front lens unit that effectively corrects the aberration. Therefore, the weight of the lenses may increase even when the weight of the lens barrel decreases, and it is difficult to manufacture the light-weight telephoto lens.

SUMMARY OF THE INVENTION

The present invention provides an optical system that is reduced in weight while an aberration is appropriately corrected and that is not easily influenced by a manufacturing error of an aspherical surface.

An optical system as one aspect of the present invention, in order from an object side to an image side, includes a first lens unit having a positive refractive power, a second lens unit having a negative refractive power, and a third lens unit having a positive or negative refractive power. The first lens unit is configured by a first partial lens unit and a second partial lens unit each having a positive refractive power. The first partial lens unit is configured by a positive single lens, and has at least one aspherical surface. The second partial lens unit is configured by a positive lens and a negative lens, and has a diffraction optical surface of a diffraction optical element that is rotationally symmetric with reference to an optical axis direction. The second lens unit is a focus lens unit that is movable in the optical axis direction. A paraxial lateral magnification $\beta$asph at the image side with reference to a surface disposed closest to the object side of the aspherical surface when the optical system focuses on infinity meets a predetermined condition.

An optical apparatus as another aspect of the present invention includes the optical system and a photoelectric conversion element configured to receive light of an image formed by the optical system.

Further features and aspects of the present invention will become apparent from the following description of exemplary embodiments with reference to the attached drawings.

DESCRIPTION OF THE PREFERRED EMBODIMENTS

Figure 1:
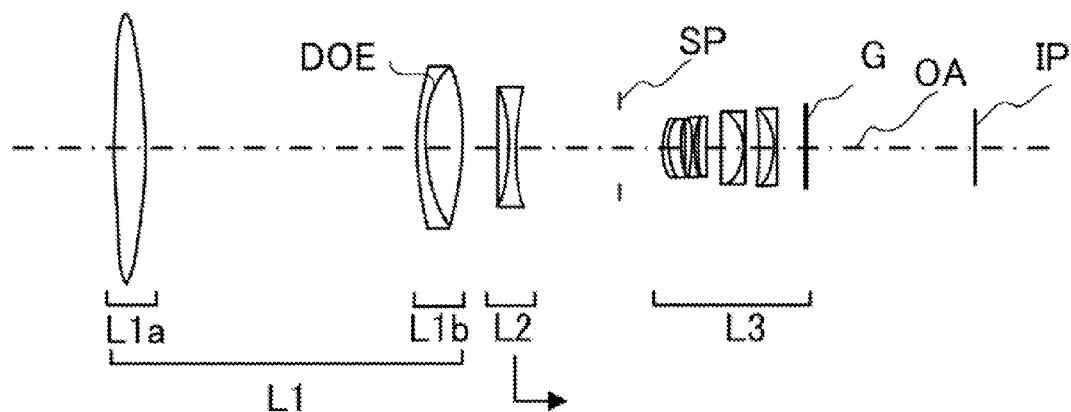
FIG. 1 is a cross-sectional diagram of a telephoto lens in Embodiment 1.

Exemplary embodiments of the present invention will be described below with reference to the accompanied drawings. In each of the drawings, the same elements will be denoted by the same reference numerals and the duplicate descriptions thereof will be omitted.

Figure 2:
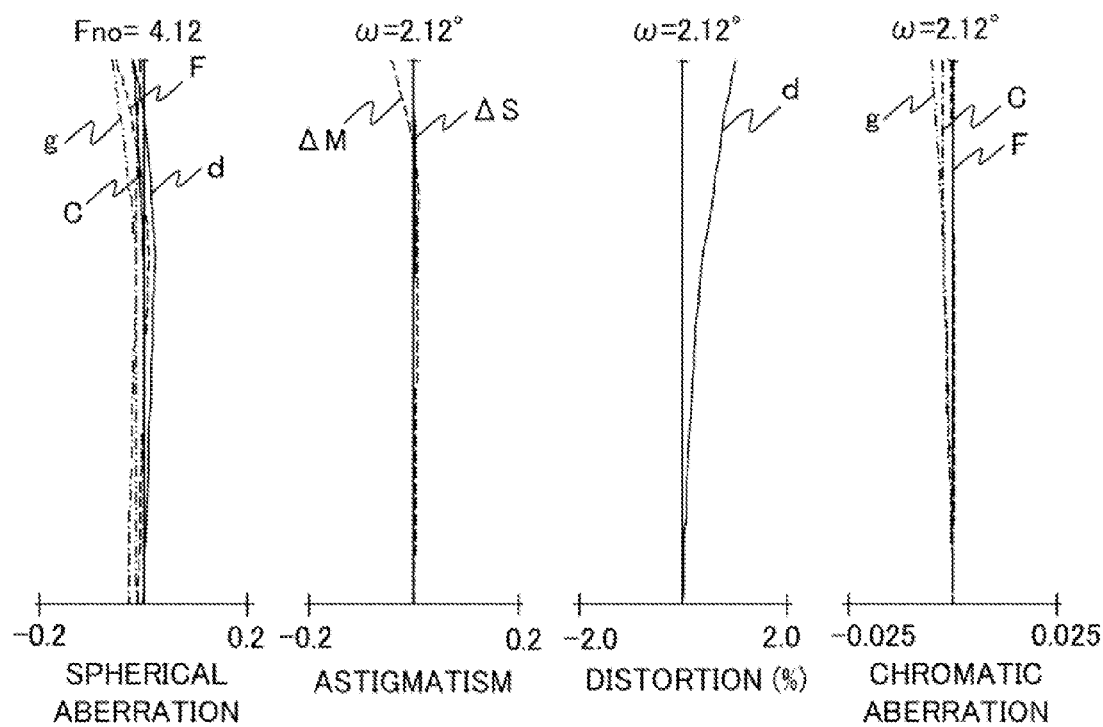
FIG. 2 is a longitudinal aberration diagram of the telephoto lens when focusing on infinity in Embodiment 1.
Figure 3:
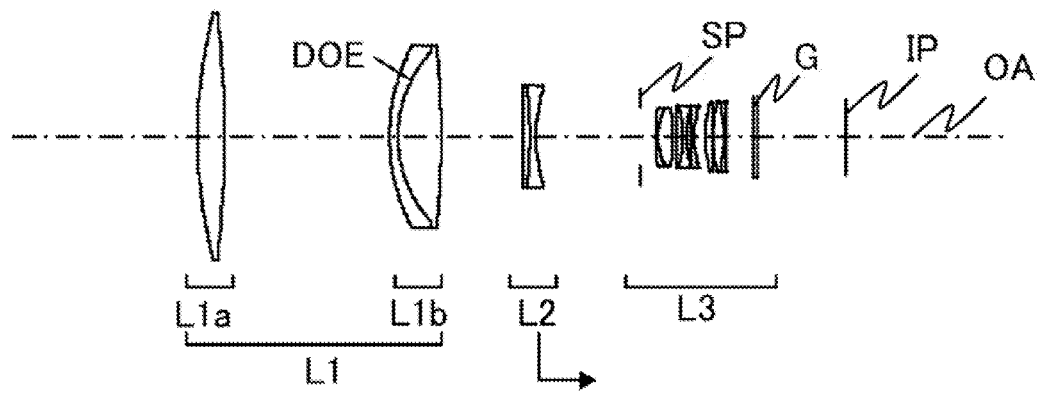
FIG. 3 is a cross-sectional diagram of a telephoto lens in Embodiment 2.
Figure 4:
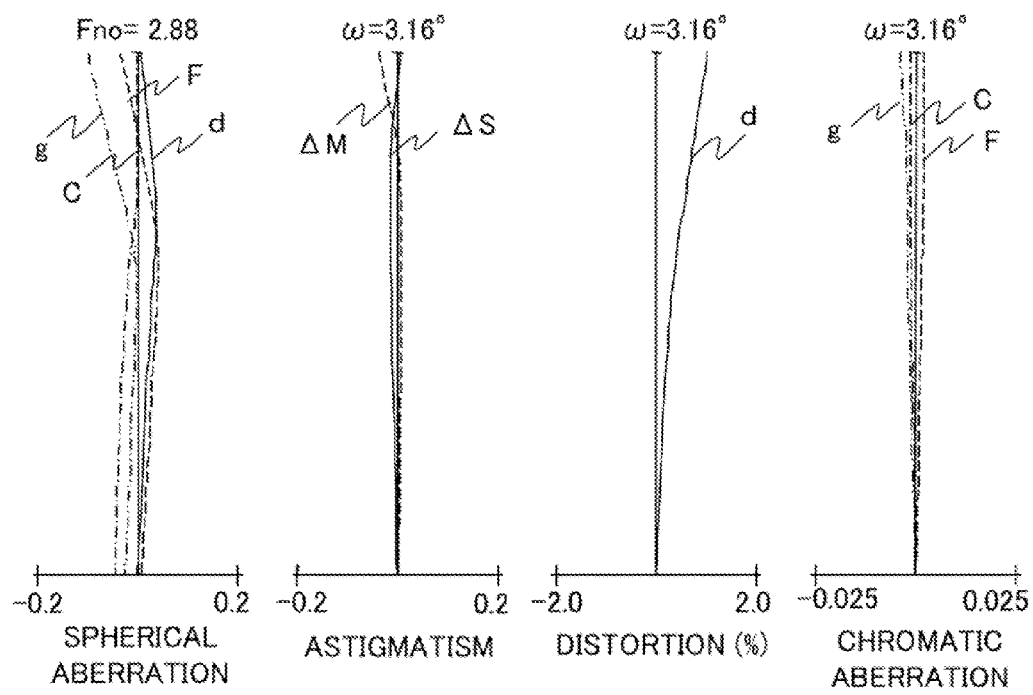
FIG. 4 is a longitudinal aberration diagram of the telephoto lens when focusing on infinity in Embodiment 2.
Figure 5:
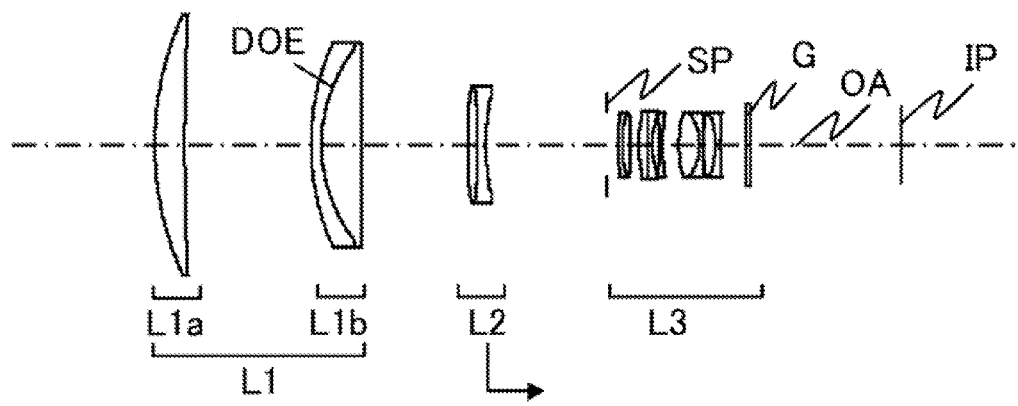
FIG. 5 is a cross-sectional diagram of a telephoto lens in Embodiment 3.
Figure 6:
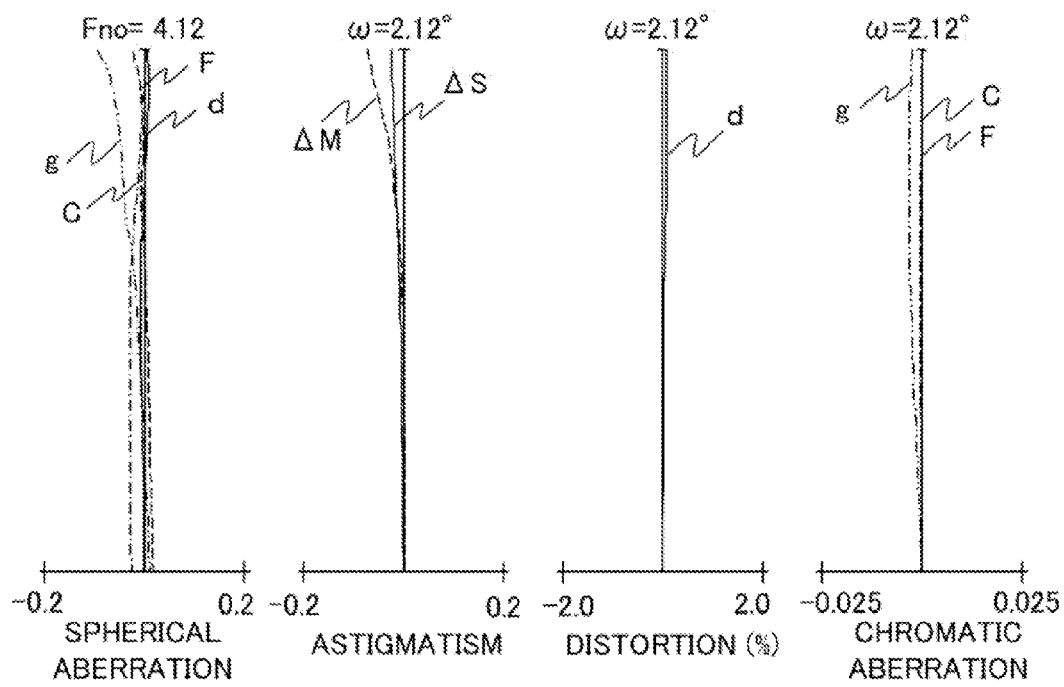
FIG. 6 is a longitudinal aberration diagram of the telephoto lens when focusing on infinity in Embodiment 3.

FIGS. 1, 3, and 5 are cross-sectional diagrams of telephoto lenses (telephoto-type lenses) in embodiments (Embodiments 1 to 3) of the present invention, respectively. FIGS. 2, 4, and 6 are longitudinal aberration diagrams of the telephoto lenses in Embodiments 1 to 3 when focusing on infinity, respectively.

In the cross-sectional diagrams of FIGS. 1, 3, and 5, the left side is an object side (a front side, or an enlargement side) and the right side is an image side (a rear side, or a reduction side). When reference symbol i is an order of a lens unit counted from the object side, reference symbol Li (i=1, 2, 3, denotes an i-th lens unit. Reference symbol SP denotes an aperture stop, and reference symbol IP denotes an image plane. When the telephoto lens is used as an image pickup optical system such as a video camera or a digital still camera, the image plane corresponds to an image pickup surface of a solid-state image pickup element (a photoelectric conversion element) such as a CCD sensor or a CMOS sensor. On the other hand, when the telephoto lens is used in a silver-salt film camera, the image plane corresponds to a film surface. Reference symbol OA denotes an optical axis. Reference symbol DOE denotes a diffraction optical element. Reference symbol G denotes a glass block such as a filter or a faceplate.

In the aberration diagrams of FIGS. 2, 4, and 6, reference symbols d, g, C, and F are d-line, g-line, C-line, and F-line, respectively. Reference symbols ΔM and ΔS are a meridional image plane and a sagittal image plane of the d-line, respectively. A distortion is indicated by using the d-line. Reference symbol Fno denotes an aperture ratio (an F-number), and reference symbol ω denotes a half angle of view The telephoto lens (an optical system) in the present embodiment includes, in order from the object side to the image side, a first lens unit L1 having a positive refractive power, a second lens unit L2 having a negative refractive power, and a third lens unit L3 having a positive or negative refractive power. The first lens unit L1 is configured by a first partial lens unit L1$a$ and a second partial lens unit L1$b$ each having a positive refractive power. The first partial lens unit L1$a$ is configured by a positive single lens, and the second partial lens unit L1$b$ is configured by one positive lens and one negative lens. At least one surface of the first partial lens unit L1$a$ is an aspherical surface, and the second partial lens unit L1$b$ has a diffraction optical surface constituted of a diffraction optical element that is rotationally symmetric with respect to an optical axis (an optical axis direction). The second lens unit L2 having the negative refractive power is a focus lens unit that is movable in the optical axis direction during an in-focus state.

When a paraxial lateral magnification at the image side with reference to a surface which is disposed closest to the object side of aspherical surfaces disposed in the first partial lens unit L1$a$ in a case where the optical system focuses on infinity is βasph, following conditional expression (1) is met.

$$0<\beta asph<2.0 \quad (1)$$

The paraxial lateral magnification at the image side with reference to a surface which is disposed closest to the object side of aspherical, surfaces means a paraxial lateral magnification from a surface disposed at the image side next to the aspherical surface without including the aspherical surface itself. For example, when the aspherical surface is disposed on a k-th surface counted from the object side in the optical system, the paraxial lateral magnification βasph is a paraxial lateral magnification at the image side from a (k+1)th surface counted from the object side.

Conditional expression (1) is a conditional expression which represents an error sensitivity of an aspherical surface of the optical system in the present embodiment. When the paraxial lateral magnification βasph becomes higher in the optical system, the sensitivity for the error becomes higher. Accordingly, when the paraxial lateral magnification βasph is beyond the upper limit of conditional expression (1), it is necessary to perform a fabrication and an assembly with high accuracy in manufacturing and the degree of difficulty gets higher. Therefore, the range of conditional expression (1) is met to be able to manufacture the optical system without heightening the degree of difficulty.

It is preferred that conditional expression (1) be set to a range represented by following expression (1a).

$$0.5<\beta asph<2.0 \quad (1a)$$

When the paraxial lateral magnification βasph is below the lower limit of expression (1a), conversely the sensitivity of the aspherical surface is too low and therefore it is difficult to correct an aberration. It is more preferred that expression (1a) be set to a range represented by following expression (1b).

$$0.5<\beta asph<1.5 \quad (1b)$$

Furthermore, it is more preferred that expression (1b) be set to a range represented by following expression (1c).

$$0.5<\beta asph<1.0 \quad (1c)$$

The first lens unit L1 in the optical system of the present embodiment is configured by the first partial lens unit L1$a$ having a positive single lens and the second partial lens unit L1$b$ having positive and negative lenses. Commonly, the number of the first lens unit L1 of the telephoto lens is determined by a balance between a chromatic aberration and a total lens length. In the optical system of the telephoto lens, a focal length is longer than the total lens length. In the first lens unit L1 of the telephoto lens, since both passing heights of an axial paraxial ray and a pupil paraxial ray are comparatively high, it is particularly effective to correct an axial chromatic aberration and a chromatic aberration of magnification. If the total lens length is shortened to appropriately correct the chromatic aberration, the number of lenses of the first lens unit L1 has to be increased. Conversely, if the total lens length is lengthened to have a good chromatic aberration to some extent, the number of the lenses of the first lens unit L1 is reduced. Commonly, in a commercial telephoto lens, it is important to have portability as well as performance. Therefore, the first lens unit L1 is provided with lenses around four to six to correct the chromatic aberration appropriately while the total lens length is not too long.

Next, a weight of the telephoto lens will be considered. The weight of the commercial telephoto lens is determined by the addition of a weight of a lens barrel including a focus mechanism and the like and a weight of lenses, and the weight of the lenses occupies a large amount of ratio of the telephoto lens. If the lenses are reduced in weight, the lens barrel is also reduced in weight eventually because the stiffness of the lens barrel can be reduced by the weight. Accordingly, the weight of the lenses is an important factor of determining the total weight including the weight of the lens barrel. In a common telephoto lens, the weight of the lenses of the first lens unit L1 occupies around 70° to 90°, of the total weight of lenses in many cases. This is particularly remarkable when The aperture ratio (Fno) of the optical system is lowered (brightened). For example, when the telephoto lens having the focal length of 600 mm and the aperture ratio Fno of 4.0 is applied, an outside diameter of the largest lens of the first lens unit L1 is around 150 mm. On the other hand, an outside diameter of a lens at the image plane side is around 30 mm to 40 mm. Thus, since a difference around 4 to 5 times exists in the outside diameter, there is a significant difference in mass between the first lens unit L1 and a rear lens unit. Accordingly, when the weight of the telephoto lens is reduced, it is important that the first lens unit L1 is reduced in weight as much as possible.

In the telephoto lens (the optical system) in the present embodiment, the number of lenses of the first lens unit L1 is reduced to three from around four to six as a conventional telephoto lens, and therefore the weight of lenses are significantly reduced. However, the chromatic aberration and various kinds of aberrations are deteriorated in this configuration. Accordingly, in the telephoto lens of the present embodiment, the total number of lenses of the first lens unit L1 is set to three and also an aspherical surface is formed in the first partial lens unit L1$a$ to correct various kinds of aberrations such as a spherical aberration, a field curvature, or a distortion. In addition, the second partial lens unit L1b is provided with the diffraction optical element having a strong correction ability of the chromatic aberration to correct the chromatic aberration appropriately. Thus, the telephoto lens of the present embodiment appropriately corrects the chromatic aberration which is deteriorated by reducing the number of lenses of the first lens unit L1 using the diffraction optical element and also corrects aberrations other than the chromatic aberration using the aspherical surface while the number of lenses of the first lens unit L1 is reduced to three.

It is preferred that the telephoto lens (the optical system) of the present embodiment meet following conditional expression (2).

$$0<\{D/2-Lab\times(D/2/f1a)\}/(D/2)<0.9 \quad (2)$$

In conditional expression (2), reference symbol f denotes a focal length of a total system of the optical system, reference symbol Fno denotes an aperture ratio (an F-number), reference symbol f1a denotes a focal length of the first partial lens unit L1a, and reference symbol Lab (mm) denotes an interval on the optical axis between the first partial lens unit L1a and the second partial lens unit L1b. Reference symbol D denotes a value that is defined by following expression (a).

$$D=f/Fno \quad (a)$$

Hereinafter, conditional expression (2) will be described in detail. The left-hand side of conditional expression (2) is an expression approximately representing a ratio of effective diameters of the first partial lens unit L1a and the second partial lens unit L1b.

In the embodiment, reducing the weight of lenses of the first lens unit L1 will be considered. Although the weight of the lens has a proportional relation with respect to a thickness direction, it is proportional to the square of the size in a radial direction. Accordingly, considering the weight of the lens, it is important to reduce the size of the diameter of the lens. Commonly, the effective diameter of the lens of the first lens unit L1 in the telephoto lens is substantially determined by an F-number light beam. Accordingly, if the focal length f of the total system and the aperture ratio (Fno) are identified, an effective diameter $\phi 1a$ of the first partial lens unit L1a is automatically determined by following expression (b).

$$\phi 1a=f/Fno \quad (b)$$

As represented by expression (b) described above, the diameter of the first partial lens unit L1a is automatically determined. Accordingly, the rest of the weight of the first lens unit L1 is determined by the diameter of the second partial lens unit L1b. In the embodiment, the effective diameter of the second partial lens unit L1b is also determined by the F-number light beam. Accordingly, a height H1bv of an intersection of the F-number light beam and a plane extending in a direction perpendicular to the optical axis from a point on the optical axis on a surface disposed closest to the object side in the second partial lens unit L1b is approximately obtained as represented by following expression (c).

$$H1bv=D/2-Lab\times(D/2/f1a) \quad (c)$$

Conditional expression (2) represents a ratio of $\phi 1a/2$ and H1bv, and the diameter of the second partial lens unit L1b is reduced as this value becomes smaller. As a result, the weight of the first lens unit L1 can be reduced.

It is not preferred that the value be beyond the upper limit of conditional expression (2) since the weight of the first lens unit L1 increases and as a result a weight of whole of the optical system increases. It is preferred that conditional expression (2) be set to a range represented by following expression (2a).

$$0.4<\{D/2-Lab\times(D/2/f1a)\}/(D/2)<0.9 \quad (2a)$$

Furthermore, it is preferred that conditional expression (2a) be set to a range represented by following expression (2b).

$$0.4<\{D/2-Lab\times(D/2/f1a)\}/(D/2)<0.85 \quad (2b)$$

It is preferred that the optical system of the present embodiment meet following conditional expression (3) when a difference between a center part of a surface closest to the object side in the second partial lens unit L1b of the first lens unit L1 and a position of the surface at an effective diameter $\phi 1b$ in the optical axis direction is defined as dsag (mm).

$$0<\{D/2-(Lab+dsag)\times(D/2/f1a)\}/(D/2)<0.8 \quad (3)$$

In conditional expression (3), the difference dsag (mm) of the positions in the optical axis direction indicates a positive value in a direction from the object side to the image side (the image plane side) along the optical axis.

Hereinafter, conditional expression (3) will be described in detail. Conditional expression (2) described above represents the ratio of the effective diameters of the first partial lens unit L1a and the second partial lens unit L1b approximately using the interval Lab on the optical axis. However, since the surface closest to the object side of the second partial lens unit Lib is not flat, the effective diameter varies in accordance with a shape of the surface. On the other hand, conditional expression (3) is a conditional expression that considers it. If the range of conditional expression (3) is met, the weight of the lens of the first lens unit L1 can be reduced and as a result the whole of the optical system can be reduced in weight. On the contrary, it is not preferred that the value is beyond the upper limit of conditional expression (3) since the weight of the lens of the first lens unit L1 increases.

Furthermore, it is preferred that conditional expression (3) is set to a range represented by following expression (3a).

$$0.4<\{D/2-(Lab+dsag)\times(D/2/f1a)\}/(D/2)<0.8 \quad (3a)$$

It is preferred that the focal length f1a of the first partial lens unit L1a of the first lens unit L1 and the focal length f of the total system in the optical system of the present embodiment meet following concitional expression (4).

$$0.5<f1a/f<2.0 \quad (4)$$

Conditional expression (4) represents a ratio of the focal length f1a of the first partial lens unit L1a and the focal length f of the total system. It is not preferred that the value is below the lower limit of conditional expression (4) since the focal length f1a of the first partial lens unit L1a is too short and the sensitivity is high. On the contrary, it is not preferred that the value is beyond the upper limit of conditional expression (4) since the total lens length is too long or the diameter of the second partial lens unit L1b is large.

When a power of the diffraction optical element provided in the second partial lens unit L1b of the first lens unit L1 in the optical system of the present embodiment is defined as $\Phi_{DOE}$, it is preferred that the power $\Phi_{DOE}$ and the focal length f of the total system meet following conditional expression (5).

$$0<\Phi_{DOE}\times f<0.050 \quad (5)$$

Hereinafter, the power $\Phi_{DOE}$ of the diffraction optical element will be described. A phase difference function $\Phi(r, m)$ of the diffraction optical element is represented as following expression (d) using an optical path difference function $\Psi(r)$.

$$\Phi(r,m)=(2\pi/m\lambda_0)\times\Psi(r) \quad (d)$$

The optical path difference function Ψ(r) is defined by following expression (e).

$$\Psi(r) = C_2 \times r^2 + C_4 \times r^4 + C_6 \times r^6 + \ldots + C_{2n} \times r^{2n} \quad (e)$$

In expression (e), symbol m denotes a diffractive order, symbol $\lambda_0$ denotes a reference wavelength, and symbol r denotes a distance from the optical axis. Symbol $C_{2i}$ (i=1, 2, ..., n) denotes a phase coefficient of 2i-th order. In this case, the power $\Phi_{DOE}$ of the diffraction optical element for an arbitrary wavelength λ and an arbitrary diffractive order m is represented by following expression (f).

$$\Phi_{DOE} = -2 \times C_2 \times m \times \lambda / \lambda_0 \quad (f)$$

Conditional expression (5) is a conditional expression that represents a ratio of the power of the diffraction optical element and the power of the total system, i.e. an inverse of the focal length. It is not preferred that the value is beyond conditional expression (5) since the chromatic aberration cannot be corrected by the diffraction optical element and conversely it contributes to the generation of the chromatic aberration. In addition, it is not preferred that the value is beyond the upper limit of conditional expression (5) since the power of the diffraction optical element is so strong that an unnecessary diffraction flare is generated and it causes the deterioration of an image quality.

A surface closest to the object side of the first partial lens unit L1a of the first lens unit L1 in the optical system of the present embodiment is an aspherical surface, and a surface at the image side is a surface having a convex surface facing the image side. According to the configuration, an aberration correcting power is not weakened so much by the aspherical surface and the paraxial lateral magnification βasph at the image side with reference to the aspherical surface can be reduced as much as possible.

Embodiment 1

Next, referring to FIG. 1, a telephoto lens (an optical system) in Embodiment 1 of the present invention will be described. The telephoto lens of the present embodiment is configured by a first lens unit L1 having a positive refractive power, a second lens unit L2 having a negative refractive power, and a third lens unit L3 having a negative refractive power, in order from an object side to an image side. The first lens unit L1 is configured by a first partial lens unit L1a having a positive refractive power and a second partial lens unit L1b having a positive refractive power. The first partial lens unit L1a is configured by a single lens of a positive biconvex lens, and a surface closest to the object side is an aspherical surface. The second partial lens unit L1b is configured by a cemented lens of negative and positive lenses, and is provided with a diffraction optical element on its joint surface. The second lens unit L2 is a focus lens unit that moves in an image plane direction, i.e. an arrow direction in FIG. 1, on an optical axis OA to perform an in-focus operation as an object distance gets closer from infinity.

In the present embodiment, a paraxial lateral magnification βasph of conditional expression (1) that represents a lateral magnification at the image side with reference to the aspherical surface of the first partial lens unit L1a is 0.625 as indicated in Table 1, which is suppressed so as to be small. As a result, the optical system of the present embodiment can be insusceptible to a manufacturing error for a surface accuracy of the aspherical surface or the like. The numerical values corresponding to conditional expressions (2) and (3) described above are, as indicated in Table 1, 0.608 and 0.592 respectively, which are included in an appropriate range. As a result, a diameter of the second partial lens unit L1b can be sufficiently reduced.

The numerical value corresponding to conditional expression (4) that represents a relationship between focal lengths of the first partial lens unit L1a and a total system is 0.647 as indicated in Table 1. As a result, the optical system of the present embodiment can prevent the refractive power of the first partial lens unit L1a from being too strong and also prevent the sensitivity from being too high.

The numerical value corresponding to conditional expression (5) that represents a ratio of powers of the diffraction optical element and the total system is 0.034 as indicated in Table 1. As a result, the possibility of the generation of an unnecessary diffraction flare that causes the deterioration of an image quality by strengthening the power of the diffraction optical element too much can be suppressed.

The first partial lens unit L1a is configured so that the surface at the object side is an aspherical surface and the surface at the image side is a convex surface facing the image side. As a result, an aberration correcting power is not weakened by the aspherical surface too much, and the paraxial lateral magnification βasph at the image side with reference to the aspherical surface can be reduced.

Thus, in the present embodiment, the number of lenses constituting the first lens unit L1 that is heavy in weight is reduced to three and the diameter of the second partial lens unit L1b is reduced to be able to significantly reduce the weight of the total of the telephoto lens. Furthermore, the aspherical surface and the diffraction optical element can be appropriately disposed to provide the telephoto lens that is not easily influenced by the manufacturing error of the surface accuracy of the aspherical surface or the like and that is not easily influenced by the unnecessary diffraction flare. As can be seen from the aberration diagram of FIG. 2, various kinds of aberrations such as a chromatic aberration, a spherical aberration, a field curvature, and a distortion can be appropriately corrected.

Embodiment 2

Next, referring to FIG. 3, a telephoto lens (an optical system) in Embodiment 2 of the present invention will be described. The telephoto lens of the present embodiment is configured by a first lens unit L1 having a positive refractive power, a second lens unit L2 having a negative refractive power, and a third lens unit L3 having a positive refractive power, in order from an object side to an image side. The first lens unit L1 is configured by a first partial lens unit L1a having a positive refractive power and a second partial lens unit L1b having a positive refractive power. The first partial lens unit L1a is configured by a single lens of a positive biconvex lens, and a surface closest to the object side is an aspherical surface. The second partial lens unit L1b is configured by a cemented lens having negative and positive lenses; and its joint surface is provided with a diffraction optical element. The second lens unit L2 is a focus lens unit that moves in an image plane direction, i.e. an arrow direction in FIG. 3, on an optical axis OA to perform an in-focus operation as an object distance gets closer from infinity.

In the present embodiment, a paraxial lateral magnification βasph of conditional expression (1) that represents a lateral magnification at the image side with reference to the aspherical surface is 0.721 as indicated in Table 1, which is suppressed so as to be small. As a result, the optical system of the present embodiment can be insusceptible to a manufacturing error for a surface accuracy of the aspherical surface or the like. The numerical values corresponding to conditional expressions (2) and (3) described above are, as indicated in Table 1, 0.762 and 0.732 respectively, which are included in an appropriate range. As a result, a diameter of the second partial lens unit L1b can be sufficiently reduced.

The numerical value corresponding to conditional expression (4) that represents a relationship between focal lengths of the first partial lens unit L1a and a total system is 1.006 as indicated in Table 1. As a result, the optical system of the present embodiment can prevent the refractive power of the first partial lens unit L1a from being too strong and also prevent the sensitivity from being too high.

The numerical value corresponding to conditional expression (5) that represents a ratio of powers of the diffraction optical element and the total system is 0.018 as indicated in Table 1. As a result, the possibility of the generation of an unnecessary diffraction flare that causes the deterioration of an image quality by strengthening the power of the diffraction optical element too much can be suppressed.

The first partial lens unit L1a is configured so that the surface at the object side is an aspherical surface and the surface at the image side is a convex surface facing the image side. As a result, an aberration correcting power is not weakened by the aspherical surface too much, and the paraxial lateral magnification βasph at the image side with reference to the aspherical surface can be reduced.

Thus, in the present embodiment, the number of lenses constituting the first lens unit L1 that is heavy in weight is reduced to three and the diameter of the second partial lens unit L1b is reduced to be able to significantly reduce the weight of the total of the telephoto lens. Furthermore, the aspherical surface and the diffraction optical element can be appropriately disposed to provide the telephoto lens that is not easily influenced by the manufacturing error of the surface accuracy of the aspherical surface or the like and that is not easily influenced by the unnecessary diffraction flare. As can be seen from the aberration diagram of FIG. 4, various kinds of aberrations such as a chromatic aberration, a spherical aberration, a field curvature, and a distortion can be appropriately corrected.

Embodiment 3

Next, referring to FIG. 5, a telephoto lens (an optical system) in Embodiment 3 of the present invention will be described. The telephoto lens of the present embodiment is configured by a first lens unit L1 having a positive refractive power, a second lens unit L2 having a negative refractive power, and a third lens unit L3 having a negative refractive power, in order from an object side to an image side. The first lens unit L1 is configured by a first partial lens unit L1a having a positive refractive power and a second partial lens unit L1b having a positive refractive power. The first partial lens unit L1a is configured by a single lens of a convex meniscus lens having a convex surface facing the object side, and a surface at the object side is an aspherical surface. The second partial lens unit L1b is configured by a cemented lens of negative and positive lenses, and is provided with a diffraction optical element on its joint surface. The second lens unit L2 is a focus lens unit that moves in an image plane direction, i.e. an arrow direction in FIG. 5, on an optical axis OA to perform an in-focus operation as an object distance gets closer from infinity.

In the present embodiment, a paraxial lateral magnification βasph of conditional expression (1) that represents a lateral magnification at the image side with reference to the aspherical surface is 1.653 as indicated in Table 1, which is suppressed so as to be small. As a result, the optical system of the present embodiment can be insusceptible to a manufacturing error for a surface accuracy of the aspherical surface or the like. The numerical values corresponding to conditional expressions (2) and (3) described above are, as indicated in Table 1, 0.824 and 0.795 respectively, which are included in an appropriate range. As a result, a diameter of the second partial lens unit Lib can be sufficiently reduced.

The numerical value corresponding to conditional expression (4) that represents a relationship between focal lengths of the first partial lens unit L1a and a total system is 0.687 as indicated in Table 1. As a result, the optical system of the present embodiment can prevent the refractive power of the first partial lens unit L1a from being too strong and also prevent the sensitivity from being too high.

The numerical value corresponding to conditional expression (5) that represents a ratio of powers of the diffraction optical element and the total system is 0.020 as indicated in Table 1. As a result, the possibility of the generation of an unnecessary diffraction flare that causes the deterioration of an image quality by strengthening the power of the diffraction optical element too much can be suppressed.

Thus, in the present embodiment, the number of lenses constituting the first lens unit L1 that is heavy in weight is reduced to three and the diameter of the second partial lens unit L1b is reduced to be able to significantly reduce the weight of the total of the telephoto lens. Furthermore, the aspherical surface and the diffraction optical element can be appropriately disposed to provide the telephoto lens that is not easily influenced by the manufacturing error of the surface accuracy of the aspherical surface or the like and that is not easily influenced by the unnecessary diffraction flare. As can be seen from the aberration diagram of FIG. 6, various kinds of aberrations such as a chromatic aberration, a spherical aberration, a field curvature, and a distortion can be appropriately corrected.

Specific numerical data of the optical systems (the telephoto lenses) in Embodiments 1 to 3 are indicated as Numerical embodiments 1 to 3, respectively. The surface number is counted in order from the object side. Symbol R denotes a radius of curvature (mm), Symbol D denotes a surface interval (mm), and Symbols Nd and vd denote a refractive index and Abbe's number for the d-line respectively. Symbol BF denotes a back focus, and a total lens length denotes a distance from a first surface to an image plane.

Symbol * is added behind the surface number for an aspherical surface. A shape of the aspherical surface is represented as following expression (6), where X denotes a displacement amount from a surface top in an optical axis direction, h denotes a height from an optical axis in a direction perpendicular to the optical axis, r denotes a paraxial radius of curvature, K denotes a conic constant, and B, C, D, E, . . . denote aspherical coefficients of respective orders.

$$X(h) = \frac{(1/r)h^2}{1+\sqrt{1-(1+K)(h/r)^2}} + Bh^4 + Ch^6 + Dh^8 + Eh^{10} \quad (6)$$

The description of "E±XX" in each aspherical coefficient means "×10±XX". Additionally, the numerical values corresponding to conditional expressions (1) to (5) described above are indicated in Table 1.

[NUMERICAL EMBODIMENT 1]
Unit mm

| Surface number | R | D | Nd | vd | Effective diameter of ray |
|---|---|---|---|---|---|
| 1* | 456.265 | 16.36 | 1.48749 | 70.2 | 141.99 |
| 2 | −306.433 | 148.39 | | | 141.76 |
| 3 | 150.795 | 4.20 | 1.72047 | 34.7 | 85.77 |
| 4 (diffraction) | 86.085 | 19.17 | 1.43875 | 94.9 | 82.03 |
| 5 | −198.729 | 19.41 | | | 80.48 |
| 6 | 844.357 | 6.56 | 1.80809 | 22.8 | 63.34 |
| 7 | −119.505 | 4.00 | 1.80000 | 29.8 | 62.59 |
| 8 | 112.974 | 56.47 | | | 57.61 |
| 9(stop) | ∞ | 24.58 | | | 40.09 |
| 10 | 62.330 | 1.90 | 1.83481 | 42.7 | 31.52 |
| 11 | 28.464 | 8.57 | 1.48749 | 70.2 | 30.39 |
| 12 | 180.259 | 2.00 | | | 30.18 |
| 13 | 476.171 | 2.81 | 1.84666 | 23.9 | 30.21 |
| 14 | −203.497 | 1.70 | 1.77250 | 49.6 | 30.17 |
| 15 | 80.921 | 2.80 | | | 30.07 |
| 16 | −172.136 | 2.50 | 1.77250 | 49.6 | 30.25 |
| 17 | 390.104 | 9.64 | | | 31.01 |
| 18 | 431.496 | 10.94 | 1.80000 | 29.8 | 35.44 |
| 19 | −26.637 | 2.50 | 1.80809 | 22.8 | 36.18 |
| 20 | −112.366 | 5.45 | | | 37.92 |
| 21 | −210.768 | 8.26 | 1.74950 | 35.3 | 38.66 |
| 22 | −33.352 | 2.50 | 1.59282 | 68.6 | 39.08 |
| 23 | −359.526 | 15.00 | | | 39.27 |
| 24 | ∞ | 2.00 | 1.51633 | 64.1 | 45.00 |
| 25 | ∞ | 90.78 | | | 45.00 |
| Image surface | ∞ | | | | |

Aspherical surface data

| Conic constant (K) | 4th order coefficient (B) | 6th order coefficient (C) | 8th order coefficient (D) | 10th order coefficient (E) |
|---|---|---|---|---|
| K | B | C | D | E |

First surface

| −8.65758E+00 | −2.49178E−08 | −4.46206E−13 | 1.34417E−17 | −4.76772E−22 |
|---|---|---|---|---|
| C2 | C4 | C6 | C8 | C10 |

Fourth surface (diffraction surface)

| −2.87716E−05 | −8.57196E−10 | 2.38070E−13 | 2.42391E−16 | 1.04092E−19 |
|---|---|---|---|---|
| C12 | C14 | C16 | C18 | C20 |
| −3.09958E−23 | −5.83044E−26 | 7.22774E−30 | 2.74484E−32 | −9.58676E−36 |

Various kinds of data

| | |
|---|---|
| Focal length | 585.00 |
| Fno | 4.12 |
| Image height | 21.64 |
| Total lens length | 468.50 |
| BF | 90.78 |
| Entrance pupil position | 918.95 |
| Exit pupil position | −121.11 |
| Principal point position at front side | −111.15 |
| Principal point position at rear side | −494.22 |

Unit data

| Unit | Start surface | Focal length | Lens configuration length | Principal point position at front side | Principal point position at rear side |
|---|---|---|---|---|---|
| 1 | 1 | 208.48 | 188.12 | 131.31 | −96.98 |
| 2 | 6 | −166.22 | 10.56 | 6.85 | 0.96 |
| 3 | 9 | −3046.05 | 103.16 | −698.07 | −1026.71 |

[NUMERICAL EMBODIMENT 1]
Unit mm

Single lens data

| Lens | Start surface | Focal length |
| --- | --- | --- |
| 1 | 1 | 378.700 |
| 2 | 3 | −290.950 |
| 3 | 4 | 138.690 |
| 4 | 6 | 129.950 |
| 5 | 7 | −72.040 |
| 6 | 10 | −64.400 |
| 7 | 11 | 68.080 |
| 8 | 13 | 168.710 |
| 9 | 14 | −74.750 |
| 10 | 16 | −154.310 |
| 11 | 18 | 31.700 |
| 12 | 19 | −43.780 |
| 13 | 21 | 51.830 |
| 14 | 22 | −62.190 |
| 15 | 24 | 0.000 |

[NUMERICAL EMBODIMENT 2]
Unit mm

| Surface number | R | D | Nd | νd | Effective diameter of ray |
| --- | --- | --- | --- | --- | --- |
| 1* | 265.091 | 14.97 | 1.48749 | 70.2 | 136.06 |
| 2 | −685.063 | 93.73 | | | 135.56 |
| 3* | 113.622 | 4.80 | 1.72047 | 34.7 | 100.54 |
| 4 (diffraction) | 71.801 | 24.65 | 1.43875 | 94.9 | 94.22 |
| 5 | −436.025 | 46.22 | | | 92.33 |
| 6 | 521.226 | 4.59 | 1.80809 | 22.8 | 56.57 |
| 7 | −224.196 | 3.50 | 1.83400 | 37.2 | 55.66 |
| 8 | 96.560 | 58.62 | | | 51.92 |
| 9(stop) | ∞ | 9.00 | | | 34.45 |
| 10 | 141.177 | 1.40 | 1.80610 | 33.3 | 31.38 |
| 11 | 35.670 | 7.59 | 1.74320 | 49.3 | 31.34 |
| 12 | −373.015 | 3.00 | | | 31.43 |
| 13 | −262.313 | 3.55 | 1.84666 | 23.9 | 33.38 |
| 14 | −62.080 | 1.80 | 1.60311 | 60.6 | 33.39 |
| 15 | 55.796 | 2.85 | | | 33.03 |
| 16 | −864.562 | 1.80 | 1.69680 | 55.5 | 33.10 |
| 17 | 64.939 | 6.26 | | | 34.05 |
| 18 | 78.669 | 4.13 | 1.61340 | 44.3 | 37.31 |
| 19 | −1963.213 | 0.15 | | | 37.76 |
| 20 | 80.944 | 5.90 | 1.65412 | 39.7 | 38.80 |
| 21 | −108.306 | 1.80 | 1.80809 | 22.8 | 38.86 |
| 22 | −722.366 | 15.00 | | | 39.07 |
| 23 | ∞ | 2.20 | 1.51633 | 64.1 | 45.00 |
| 24 | ∞ | 50.01 | | | 45.00 |
| Image surface | ∞ | 0.00 | | | 0.00 |

Aspherical surface data

| Conic constant (K) | 4th order coefficient (B) | 6th order coefficient (C) | 8th order coefficient (D) | 10th order coefficient (E) |
| --- | --- | --- | --- | --- |
| K | B | C | D | E |

First surface

| −1.69132E+00 | −1.62516E−08 | −4.69782E−13 | −1.15280E−17 | 9.66984E−22 |

Third surface

| 7.57830E−02 | 9.88754E−09 | 3.11094E−12 | −5.74829E−18 | 4.92984E−20 |
| C2 | C4 | C6 | C8 | C10 |

-continued

[NUMERICAL EMBODIMENT 2]
Unit mm

Fourth surface
(Diffraction surface)

| −2.30995E−05 | −1.65751E−09 | 3.19712E−13 | 4.22082E−16 | −1.57461E−19 |
|---|---|---|---|---|
| C12 | C14 | C16 | C18 | C20 |
| −8.39652E−23 | 2.04106E−26 | 3.85013E−29 | −1.93466E−32 | 2.60903E−36 |

Various kinds of data

| | |
|---|---|
| Focal length | 391.86 |
| Fno | 2.88 |
| Image height | 21.64 |
| Total lens length | 367.51 |
| BF | 50.01 |
| Entrance pupil position | 994.01 |
| Exit pupil position | −62.95 |
| Principal position at front side | 26.51 |
| Principal position of rear side | −341.84 |

Unit data

| Unit | Start surface | Focal length | Lens configuration length | Principal point position at front side | Principal point position at rear side |
|---|---|---|---|---|---|
| 1 | 1 | 196.11 | 138.15 | 73.55 | −69.18 |
| 2 | 6 | −139.97 | 8.09 | 5.42 | 0.93 |
| 3 | 9 | 472.68 | 66.42 | 65.99 | 13.75 |

Single lens data

| Lens | Start surface | Focal length |
|---|---|---|
| 1 | 1 | 394.110 |
| 2 | 3 | −288.150 |
| 3 | 4 | 141.700 |
| 4 | 6 | 194.530 |
| 5 | 7 | −80.530 |
| 6 | 10 | −59.560 |
| 7 | 11 | 44.160 |
| 8 | 13 | 95.280 |
| 9 | 14 | −48.440 |
| 10 | 16 | −86.620 |
| 11 | 18 | 123.400 |
| 12 | 20 | 71.700 |
| 13 | 21 | −157.870 |
| 14 | 23 | 0.000 |

[NUMERICAL EMBODIMENT 3]
Unit mm

| Surface number | R | D | Nd | vd | Effective diameter of ray |
|---|---|---|---|---|---|
| 1* | 172.485 | 16.75 | 1.48749 | 70.2 | 141.99 |
| 2 | 1396.706 | 70.88 | | | 141.00 |
| 3* | 140.134 | 6.00 | 1.73800 | 32.3 | 111.71 |
| 4 (diffraction) | 88.484 | 22.66 | 1.43875 | 94.9 | 105.05 |
| 5 | −1586.378 | 59.03 | | | 103.21 |
| 6 | 294.962 | 5.97 | 1.80809 | 22.8 | 64.50 |
| 7 | −239.829 | 4.00 | 1.85026 | 32.3 | 63.58 |
| 8 | 120.235 | 68.30 | | | 59.42 |
| 9(stop) | ∞ | 7.00 | | | 36.80 |
| 10 | 328.303 | 1.90 | 1.80610 | 33.3 | 34.34 |
| 11 | 72.846 | 4.52 | 1.48749 | 70.2 | 33.54 |
| 12 | −181.741 | 5.00 | | | 33.21 |
| 13 | 112.813 | 5.16 | 1.84666 | 23.9 | 36.92 |
| 14 | −210.445 | 2.20 | 1.72916 | 54.7 | 36.13 |
| 15 | 52.416 | 3.71 | | | 34.32 |

-continued

[NUMERICAL EMBODIMENT 3]
Unit mm

| | | | | | |
|---|---|---|---|---|---|
| 16 | −235.285 | 1.81 | 1.77250 | 49.6 | 34.31 |
| 17 | 92.861 | 9.32 | | | 34.49 |
| 18 | 74.058 | 11.62 | 1.62588 | 35.7 | 33.64 |
| 19 | −30.690 | 1.80 | 1.59282 | 68.6 | 34.17 |
| 20 | −819.955 | 0.15 | | | 34.82 |
| 21 | 86.889 | 7.02 | 1.65412 | 39.7 | 35.09 |
| 22 | −46.837 | 2.50 | 1.80809 | 22.8 | 34.92 |
| 23 | 270.732 | 15.00 | | | 34.85 |
| 24 | ∞ | 2.00 | 1.51633 | 64.1 | 45.00 |
| 25 | ∞ | 84.01 | | | 39.00 |
| Image plane | ∞ | | | | |

Aspherical surface data

| Conic constant (K) | 4th order coefficient (B) | 6th order coefficient (C) | 8th order coefficient (D) | 10th order coefficient (E) |
|---|---|---|---|---|
| K | B | C | D | E |

First surface

| | | | | |
|---|---|---|---|---|
| −1.50652E−01 | −6.88242E−09 | −5.06956E−13 | 9.93314E−18 | −1.59750E−21 |

Third surface

| | | | | |
|---|---|---|---|---|
| −9.07249E−02 | −3.77743E−09 | 1.11841E−12 | −1.42203E−16 | 2.80072E−20 |
| C2 | C4 | C6 | C8 | C10 |

Fourth surface
(Diffraction surface)

| | | | | |
|---|---|---|---|---|
| −1.71811E−05 | −6.42248E−10 | 2.36386E−13 | −1.23325E−16 | 1.80914E−20 |
| C12 | C14 | C16 | C18 | C20 |
| 0.00000E+00 | 0.00000E+00 | 0.00000E+00 | 0.00000E+00 | 0.00000E+00 |

Various kinds of data

| | |
|---|---|
| Focal length | 585.00 |
| Fno | 4.12 |
| Image height | 21.64 |
| Total lens length | 418.30 |
| BF | 84.01 |
| Entrance pupil position | 990.34 |
| Exit pupil position | −69.11 |
| Principal point position at front side | −659.63 |
| Principal point position at rear side | −500.99 |

Unit data

| Unit | Start surface | Focal length | Lens configuration length | Principal point position at front side | Principal point position at rear side |
|---|---|---|---|---|---|
| 1 | 1 | 233.68 | 116.29 | 40.82 | −69.06 |
| 2 | 6 | −227.12 | 9.97 | 8.91 | 3.31 |
| 3 | 9 | −375.93 | 80.69 | −11.12 | −80.57 |

Single lens data

| Lens | Start surface | Focal length |
|---|---|---|
| 1 | 1 | 401.870 |
| 2 | 3 | −346.170 |
| 3 | 4 | 190.560 |
| 4 | 6 | 164.510 |
| 5 | 7 | −93.710 |
| 6 | 10 | −116.520 |
| 7 | 11 | 107.300 |
| 8 | 13 | 87.380 |
| 9 | 14 | −57.350 |
| 10 | 16 | −85.980 |
| 11 | 18 | 36.210 |
| 12 | 19 | −53.830 |
| 13 | 21 | 47.510 |
| 14 | 22 | −49.240 |
| 15 | 24 | 0.000 |

TABLE 1

|  | EMBODIMENT 1 | EMBODIMENT 2 | EMBODIMENT 3 |
|---|---|---|---|
| f | 585.00 | 391.86 | 585.00 |
| f1a | 378.70 | 394.11 | 401.87 |
| Lab | 148.39 | 93.73 | 70.88 |
| Fno | 4.12 | 2.88 | 4.12 |
| dsag | 6.23 | 11.90 | 11.56 |
| C2 | −2.88E−05 | −2.31E−05 | −1.72E−05 |
| Φ(DOE) | 5.75E−05 | 4.62E−05 | 3.44E−05 |
| CONDITIONAL EXPRESSION (1) βasph | 0.625 | 0.721 | 1.653 |
| CONDITIONAL EXPRESSION (2) {D/2 − Lab × (D/2/f1a)}/(D/2) | 0.608 | 0.762 | 0.824 |
| CONDITIONAL EXPRESSION (3) {D/2 − (Lab + dsag) × (D/2/f1a)}/(D/2) | 0.592 | 0.732 | 0.795 |
| CONDITIONAL EXPRESSION (4) f1a/f | 0.647 | 1.006 | 0.687 |
| CONDITIONAL EXPRESSION (5) $\Phi_{DOE} \times f$ | 0.034 | 0.018 | 0.020 |

Next, referring to FIG. 7, an embodiment of a digital still camera (an image pickup apparatus) that is an optical apparatus using the telephoto lens (the optical system) in each of the embodiments described above as an image pickup optical system will be described.

Figure 7:
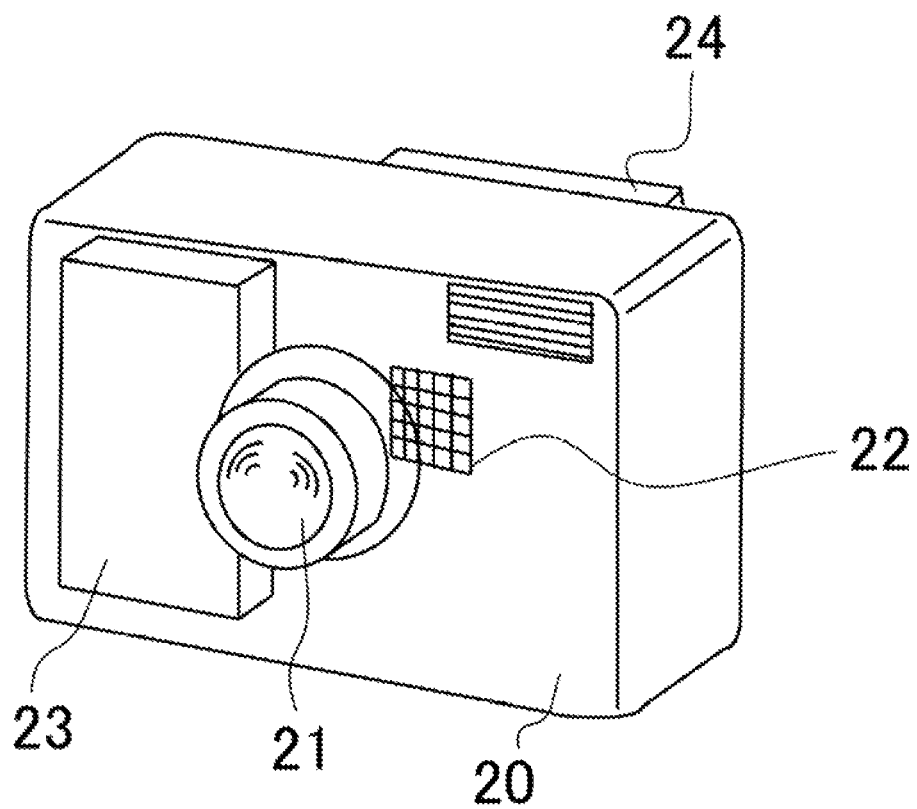
FIG. 7 is a schematic diagram of a main part of an optical apparatus (an image pickup apparatus) in the present embodiment.

In FIG. 7, reference numeral 20 denotes a camera body, reference numeral 21 denotes an image pickup optical system that is configured by the optical system of each embodiment described above, and reference numeral 22 denotes a solid-state image pickup element (a photoelectric conversion element) such as a CCD sensor or a CMOS sensor that receives an object image formed by the image pickup optical system 21. Reference numeral 23 denotes a memory that stores information corresponding to the object image that has been photoelectrically converted by the solid-state image pickup element 22, and reference numeral 24 denotes a finder that is configured by a liquid crystal display panel or the like to observe the object image formed on the solid-state image pickup element 22.

Thus, the optical system of the present embodiment is applied to the image pickup element such as a digital still camera to be able to achieve a small-size image pickup apparatus having a high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-233470, filed on Oct. 18, 2010, which is hereby incorporated by reference herein in its entirety.

What is claimed is:

1. An optical system comprising:
a first lens unit having a positive refractive power;
a second lens unit having a negative refractive power; and
a third lens unit having a positive or negative refractive power, the first, second, and third lens units being disposed in order from an object side to an image side,
wherein the first lens unit is configured by a first partial lens unit and a second partial lens unit each having a positive refractive power,
wherein the first partial lens unit is configured by a positive single lens, the first partial lens unit having at least one aspherical surface,
wherein the second partial lens unit is configured by a positive lens and a negative lens, the second partial lens unit having a diffraction optical surface of a diffraction optical element that is rotationally symmetric with reference to an optical axis,
wherein the second lens unit is a focus lens unit that is movable in a direction of the optical axis, and
wherein the following condition is met:

$$0 < \beta_{asph} < 2.0,$$

where βasph is a paraxial lateral magnification of a partial optical system between a final surface of the optical system and a lens surface that is on the image side, adjacent to an aspherical surface disposed closest to the object side when the optical system is focused at infinity.

2. The optical system according to claim 1, wherein the following condition is met:

$$0 < \{D/2 - Lab \times (D/2/f1a)\}/(D/2) < 0.9,$$

where f is a focal length of a total system of the optical system, Fno is an aperture ratio of the optical system, f1a is a focal length of the first partial lens unit, Lab is an interval between the first partial lens unit and the second partial lens unit on an optical axis, and D is equal to f/Fno.

3. The optical system according to claim 2, wherein the following condition is met:

$$0 < \{D/2 - (Lab+dsag) \times (D/2/f1a)\}/(D/2) < 0.8,$$

where dsag is a difference of positions of a center part and an effective diameter of a surface closest to the object side of the second partial lens unit in the direction of the optical axis, which indicates a positive value in a direction from the object side to the image side along the optical axis.

4. The optical system according to claim 1, wherein following expression is met:

$$0.5 < f1a/f < 2.0,$$

where f1a is a focal length of the first partial lens unit, and f is a focal length of a total system of the optical system.

5. The optical system according to claim 1, wherein following expression is met:

$$0 < \Phi_{DOE} \times f < 0.050,$$

where $\Phi_{DOE}$ is a power of the diffraction optical element that is disposed in the second partial lens unit of the first lens unit, and f is a focal length of a total system of the optical system.

6. The optical system according to claim 1, wherein the surface closest to the object side of the first partial lens unit is an aspherical surface, and a surface at the image side is a convex surface facing the image side.

7. The optical system according to claim 1, wherein the optical system is configured to form an image on an photoelectric conversion element.

8. An optical apparatus comprising:
a photoelectric conversion element; and
an optical system comprising:
a first lens unit having a positive refractive power;
a second lens unit having a negative refractive power; and
a third lens unit having a positive or negative refractive power, the first, second, and third lens units being disposed in order from an object side to an image side, wherein the first lens unit is configured by a first partial lens unit and a second partial lens unit each having a positive refractive power, wherein the first partial lens unit is configured by a positive single lens, the first partial lens unit having at least one aspherical surface, wherein the second partial lens unit is configured by a positive lens and a negative lens, the second partial lens unit having a diffraction optical surface of a diffraction optical element that is rotationally symmetric with reference to an optical axis, wherein the second lens unit is a focus lens unit that is movable in a direction of the optical axis, and wherein the following condition is met:

$$0 < \beta asph < 2.0,$$

where $\beta$asph is a paraxial lateral magnification of a partial optical system between a final surface of the optical system and a lens surface that is on the image side, adjacent to an aspherical surface disposed closest to the object side when the optical system is focused at infinity, and wherein the photoelectric conversion element configured to receive light of an image formed by the optical system.

* * * * *